(12) United States Patent
Zhang et al.

(10) Patent No.: US 9,644,095 B2
(45) Date of Patent: May 9, 2017

(54) POLYLACTIC ACID STEREOCOMPLEX COMPOSITION, ITS MOLDED PRODUCT, A PROCESS FOR ITS MANUFACTURE AND ITS APPLICATION

(71) Applicants: INSTITUTE OF CHEMISTRY, CHINESE ACADEMY OF SCIENCES, Beijing (CN); PURAC BIOCHEM BV, Gorinchem (NL)

(72) Inventors: Xiuqin Zhang, Beijing (CN); Zujiang Xiong, Beijing (CN); Guoming Liu, Beijing (CN); Xia Dong, Beijing (CN); Tao Wen, Beijing (CN); Rui Wang, Beijing (CN); Dujin Wang, Beijing (CN)

(73) Assignees: Institute of Chemistry, Chinese Academy of Sciences, Beijing (CN); Purac Biochem B.V., Gorinchem (NL)

( * ) Notice: Subject to any disclaimer, the term of this patent is extended or adjusted under 35 U.S.C. 154(b) by 0 days.

(21) Appl. No.: 14/778,375

(22) PCT Filed: Mar. 19, 2014

(86) PCT No.: PCT/EP2014/055517
§ 371 (c)(1),
(2) Date: Sep. 18, 2015

(87) PCT Pub. No.: WO2014/147132
PCT Pub. Date: Sep. 25, 2014

(65) Prior Publication Data
US 2016/0272811 A1    Sep. 22, 2016

(30) Foreign Application Priority Data
Mar. 20, 2013  (CN) .......................... 2013 1 0090619

(51) Int. Cl.
*C08K 5/20* (2006.01)
*C08L 67/04* (2006.01)
*C08G 63/08* (2006.01)
*C08J 3/21* (2006.01)

(52) U.S. Cl.
CPC .............. *C08L 67/04* (2013.01); *C08G 63/08* (2013.01); *C08J 3/21* (2013.01); *C08J 2367/04* (2013.01); *C08J 2467/04* (2013.01); *C08L 2205/025* (2013.01); *C08L 2205/24* (2013.01)

(58) Field of Classification Search
CPC .............. C08L 67/04; C08L 2205/025; C08L 2205/24; C08J 3/21; C08J 2367/04; C08J 2467/04
USPC .......................................... 524/226
See application file for complete search history.

(56) References Cited

U.S. PATENT DOCUMENTS

2014/0206807 A1*  7/2014  Sudo ...................... C08K 5/521
                                                             524/414

FOREIGN PATENT DOCUMENTS

| CN | 1898327 A | 1/2007 |
| CN | 102532837 A | 7/2012 |
| JP | 2003192884 A | 7/2003 |
| JP | 2005042084 A * | 2/2005 |
| JP | 2008063356 A | 3/2008 |
| JP | 2008248022 A | 10/2008 |
| JP | 2010001338 * | 1/2010 |
| WO | WO2013031159 A1 | 3/2013 |

OTHER PUBLICATIONS

Translation of JP2010001338, Jan. 7, 2010.*
International Search Report; Mailed Jun. 16, 2014 for PCT Application No. PCT/EP2014/055517.
International Preliminary Report on Patentability and Written Opinion; Mailed Sep. 22, 2015 for PCT Application No. PCT/EP2014/055517.

* cited by examiner

*Primary Examiner* — Hui Chin
(74) *Attorney, Agent, or Firm* — Mendelsohn Dunleavy, P.C.

(57) ABSTRACT

The instant invention discloses a polylactic acid stereocomplex composition containing pure stereocomplex crystals and a process for its manufacture. The composition according to this invention comprising (a) 30-70 wt % poly (L-lactic acid) (PLLA). (b) 70-30 wt % poly (D-lactic acid) (PDLA) and (c) 0.01-10 wt % nucleating agent, which can be obtained by solution and melt blending. Stereocomplex crystals are preferentially formed according to the invention, and the homocrystals (a crystal form) for the PLLA or PDLA homopolymer can't be observed. The melting temperature of the composition according to the invention is at least 200° C., which is about 30-50° C. higher than the PLLA or PDLA homopolymer.

20 Claims, 7 Drawing Sheets

POLYLACTIC ACID STEREOCOMPLEX COMPOSITION, ITS MOLDED PRODUCT, A PROCESS FOR ITS MANUFACTURE AND ITS APPLICATION

TECHNICAL FIELD

The instant invention discloses a polylactic acid stereocomplex composition containing pure stereocomplex crystals and a process for its manufacture. The invention also relates to a molded product comprising this composition, a process for manufacturing this composition and its use.

BACKGROUND

Polylactide or poly (Lactic acid) (PLA) is a biobased and biodegradable polymer derived from renewable resources and widely used as an alternative material to fossil-based polymers. The enhancement of the thermal stability or heat-resistant properties of PLA is a crucial issue to widen the scope of its industrial and commodity applications.

Upon mixing poly (L-lactic acid) (PLLA) with poly (D-lactic acid) (PDLA), an interesting crystalline phase will be formed. A racemic stereocomplex structure in the equimolar mixtures of PLLA and PDLA has been reported, which was defined as stereocomplex crystals. The melting temperature of the stereocomplex crystals is about 50° C. higher than that of the pure PLLA or PDLA homo-crystals. The PLA stereocomplex is expected to improve several of the properties of PLA-based materials, such as physical properties, thermal properties and hydrolysis resistance.

However, the formation of stereocomplex is affected by many factors, such as the blend ratio, molecular weight, optical purity of PLLA and PDLA, processing and heat treatment conditions. It means that there is a competitive relation between homocrystals (a crystal form) and stereocomplex crystals under certain conditions. So the PLA stereocomplex consisting solely of pure stereocomplex crystals cannot be obtained easily by blending PLLA and PDLA.

Recently, several patents have focused on how to improve the crystallization rate and how to increase the content of stereocomplex crystals. For example, CN 102532837 discloses a method of preparation after melt mixing PLLA and PDLA at a temperature of 140-210° C. Although the higher content of stereocomplex crystals is obtained by the disclosed method, the content of stereocomplex crystals decreases and the homocrystals appears in subsequent processing.

In JP 20863356 the stereocomplex crystals are obtained after annealing at a high temperature between the melting point of the homopolymer and the stereocomplex PLA. The crystallinity is very low due to the slow crystallization rate.

In JP2008248022 a diblock copolymer of PLLA and PDLA is synthesized for improving the content of stereocomplex crystals.

The method of blending nucleating agent is simple, more convenient and efficient to improve the crystallinity of stereocomplex, in comparison to heat processing at lower temperature, annealing and synthesizing. In JP2003192884 the crystallization rate is improved by adding a phosphoric ester metal salt for nucleating agent. CN 18988327 A discloses a composition comprising stereoblock PLA and an aryl urea derivative, the stereocomplex crystals are selected and the crystallinity is improved in this method. However, the content of nucleating agent is higher, and the homocrystals can also be observed in the PLLA/PDLA blends.

The inventors have now found that the stereocomplex crystals can be selected by adding a specific nucleating agent, and that it is possible to obtain a composition of pure PLA stereocomplex crystals and substantially free of PLA homocrystals.

Contents of the Invention

The instant invention discloses a polylactic acid stereocomplex composition containing pure stereocomplex crystals, which will improve the heat-resistant property of PLA-based materials.

The instant invention discloses a polylactic acid stereocomplex composition molded product containing pure stereocomplex crystals, with high melting point, high crystallinity and heat-resistant properties.

The instant invention discloses a process for manufacturing a polylactic acid stereocomplex composition product with pure stereocomplex crystals, and the product will keep single stereocomplex crystals after heat treatment, and with high crystallinity and crystallization rate.

The instant invention discloses a molded product and its application.

The above-mentioned technical problems of the known compositions, molded products, manufacturing methods and uses can be overcome or at least mitigated by the present invention.

The objects of the present invention are achieved by means of a polylactic acid stereocomplex composition comprising PLA blend and nucleating agent, wherein the nucleating agent is at least one of aryl amid derivative, the general formula is

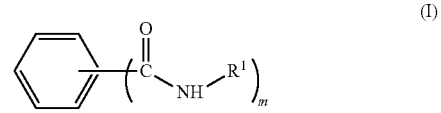

wherein $R^1$ is a cycloaliphatic group having 3-8 carbon atoms, and wherein m is an integer which ranges between and includes the values 1-6.

According to a second aspect, there is provided a polylactic acid stereocomplex composition comprising 0.01-10 wt % nucleating agent and 90-99.99 wt % PLA blend, and wherein the polylactic acid stereocomplex composition contains pure sterocomplex crystals. The polylactic acid stereocomplex composition preferably comprising 0.2-5 wt % nucleating agent, and more preferably 0.5-3 wt %. It is preferred that the polylactic acid stereocomplex composition is substantially free of PLA homocrystals.

According to a third aspect, there is provided a polylactic acid stereocomplex composition, wherein the PLA blend comprises 30-70 wt % PLLA, and 70-30 wt % PDLA, and preferably 50 wt % PLLA and 50 wt % PDLA.

According to a fourth aspect, there is provided a polylactic acid stereocomplex composition, wherein $R^1$ in chemical formula (I) represents a naphthenic group with 5 or 6 carbon atoms, and m is an integer which ranges between and includes the values 2-4. More preferably it is at least one of N,N'-dicyclohexylterephthalamide, and N,N',N"-tricyclohexyl1,3,5-benzenetricarboxylamide.

According to a fifth aspect, there is provided a polylactic acid sterocomplex composition, wherein the weight-average molecular weight of at least one of components PLLA and PDLA is 10-500 kg/mol, and the optical purity of at least one of components PLLA and PDLA is above 90%, preferably above 98%.

According to a sixth aspect, there is provided a polylactic acid stereocomplex composition, wherein the melting point of the composition is above 200° C., and preferably between 200 and 230° C.

According to a seventh aspect, there is provided a polylactic acid stereocomplex composition, wherein the relative content of the stereocomplex crystals in the crystal phase is above 95%, and preferably substantially 100%, whereby the crystallization is preferably isothermal at a temperature above 120° C., more preferably at a temperature between 120 and 140° C. This has been measured by WAXD or by DSC under standard conditions. Both methods gave substantially the same results.

According to an eight aspect, there is provided a molded product containing the polylactic acid stereocomplex composition as described before, said composition preferably comprising 0.01-10 wt % nucleating agent and 90-99.99 wt % PLA blend, wherein the PLA blend comprising PLLA and PDLA. The molded product of the polylactic acid stereocomplex composition preferably comprises 0.2-5 wt % nucleating agent, and more preferably 0.5-3 wt %.

According to a ninth aspect, there is provided a molded product containing polylactic acid stereocomplex composition comprising stereocomplex crystals, wherein the polylactic acid stereocomplex composition contains pure stereocomplex crystals.

According to a tenth aspect, there is provided a molded product containing polylactic acid stereocomplex composition, wherein the PLA blend comprises 30-70 wt % PLLA and 70-30 wt % PDLA, and preferably 50 wt % PLLA and 50 wt % PDLA.

According to an eleventh aspect, there is provided a molded product of the polylactic acid stereocomplex composition, wherein $R^1$ in chemical formula (I) represents a naphthenic group with 5 or 6 carbon atoms, and m is an integer which ranges between and includes the values 2-4. More preferably it is at least one of N,N'-dicyclohexylterephthalamide, and N,N',N"-tricyclohexyl-1,3,5-benzenetricarboxylamide.

According to an twelfth aspect, there is provided a molded product of the polylactic acid stereocomplex composition, wherein the weight-average molecular weight of at least one of components PLLA and PDLA is 10-500 kg/mol, and the optical purity of at least one of components PLLA and PDLA is above 90%, preferably above 98%.

According to a thirteenth aspect, there is provided a molded product of the polylactic acid stereocomplex composition, wherein the melting point of the composition is above 200° C., and preferably between 200 and 230° C.

According to a fourteenth aspect, there is provided a molded product containing a polylactic acid stereocomplex composition, wherein the relative content of the stereocomplex crystals in the crystal phase is above 95% and preferably substantially 100%, whereby the crystallization is preferably isothermal at a temperature above 120° C., more preferably at a temperature between 120 and 140° C.

According to a fifteenth aspect, there is provided a molded product containing a polylactic acid stereocomplex composition, wherein the storage modulus is above 20 MPa at 180° C. in the DMA curves.

According to a sixteenth aspect, there is provided a process for manufacturing a polylactic acid stereocomplex composition, wherein solution or melt blending can be chosen.

According to a seventeenth aspect, there is provided a process for manufacturing a polylactic acid stereocomplex composition, wherein PLLA and PDLA resins are mixed in trichloromethane with a weight ratio of PLLA/PDLA ranging from 30/70 to 70/30, to which mixture 0.01-10 wt % (based on the gross weight of PLLA and PDLA) of the nucleating agent (at least one of N,N'-dicyclohexylterephthalamide, and N,N',N"-tricyclohexyl1,3,5-benzenetricarboxylamide) is added, the mixture being subsequently stirred for 1-60 min, after which the mixture is cast on a surface and dried in vacuo, whereby the PLA stereocomplex composition is obtained.

According to a eighteenth aspect, there is provided a polylactic acid stereocomplex composition or a molded product for application in garment material, food packaging, medical cloth and heat-resistant end-uses.

The present invent has the following advantages:

1. A polylactic acid stereocomplex composition according to the present invention, wherein the relative content of the stereocomplex crystals in the crystal phase is above 95%.

2. A polylactic acid stereocomplex composition according to the present invention, wherein substantially 100% stereocomplex crystals are still present after melting several times.

3. A nucleating agent according to the present invention has such properties as inexpensive and lower dosage.

4. A process for manufacturing according to the present invention is simple and feasible.

5. A process for manufacturing according to the present invention is suited for solution blending, melt blending, molding or spinning.

A polylactic acid stereocomplex composition and its molding product according to the present invention, containing pure stereocomplex crystals and substantially no low melting PLA homocrystals. Stereocomplex crystals are preferentially formed according to the invention, and the homocrystals (a crystal form) for the PLLA or PDLA homopolymer cannot be observed. The melting temperature of the composition according to the invention is higher than that of the individual PLLA or PDLA homopolymers, so the heat-resistant properties of PLA-based materials improve consequently. The composition and its molding product contain pure stereocomplex crystals, and the physical properties and hydrolysis resistance of PLA-based materials improve.

DESCRIPTION OF FIGURES

The invention is further illustrated by the accompanying drawing, in which.

The invention is further illustrated by the following non-limiting Examples.

Example 1

50/50, PLLA/PDLA, 0.5 wt % N,N'-Dicyclohexylterephthalamide for Nucleating Agent Polylactic acid stereocomplex composition was prepared using PLLA from Purac Biochem B.V., characterized by $M_w=177$ kg/mol, $M_n=116$ kg/mol, polydispersity, DPI=1.53, optical purity >99%, $T_m=174°$ C. and $T_g$ 61° C. (DSC, 10° C./min); PDLA from Purac Biochem B.V., characterized by M=167 kg/mol, $M_n$ 108 kg/mol, polydispersity, DPI=1.56, optical purity >98%, $T_1=174°$ C. and $T_g=61°$ C. (DSC, 10° C./min); N,N'-dicyclohexylterephthalamide as the nucleating agent from Shanxi Provincial Institute of Chemical Industry, China, $T_m>300°$ C. The materials were dried in vacuum at 80° C. for 24 h prior to processing.

Solution blending: Equimolar PLLA and PDLA were dissolved in trichloromethane in a polymer concentration of 2 g/dL for 30 min, and 0.5 wt % (base on the gross weight of PLLA and PDLA) of the nucleating agent N,N'-dicyclohexylterephthalamide was added, and then rapidly stirred for approximately 2 h. The blends were cast on a culture dish and dried in vacuo at 80° C. for 3 days.

Figure 1:
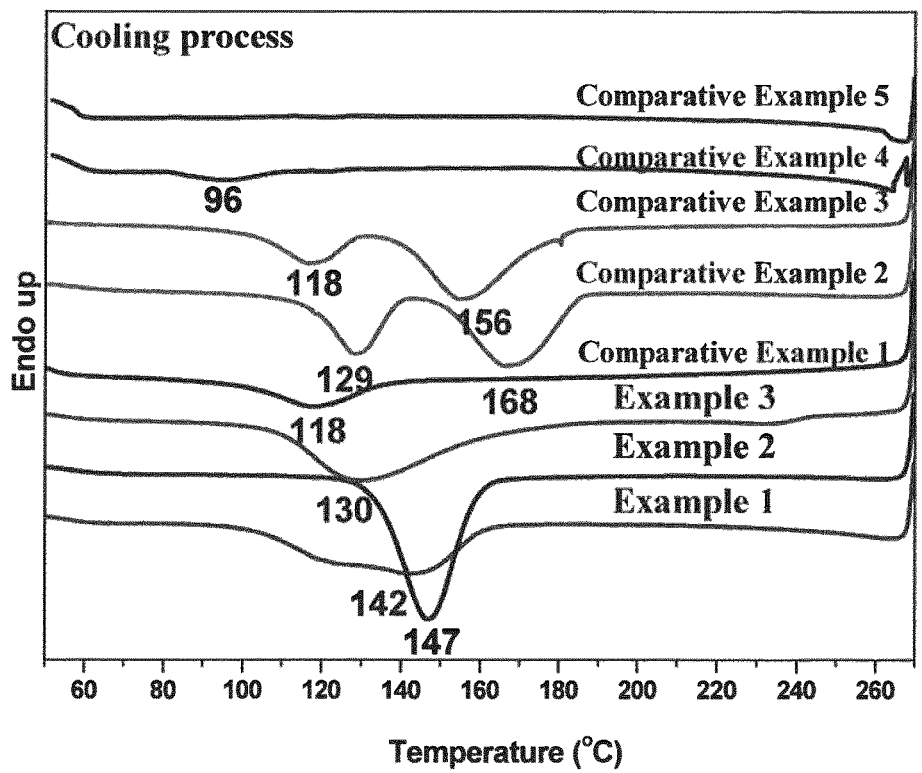
FIG. 1 shows the results of differential scanning calorimetry (DSC) during the cooling process of the products of Examples 1, 2 and 3, and Comparative Examples 1, 2, 3, 4, and 5.
Figure 2:
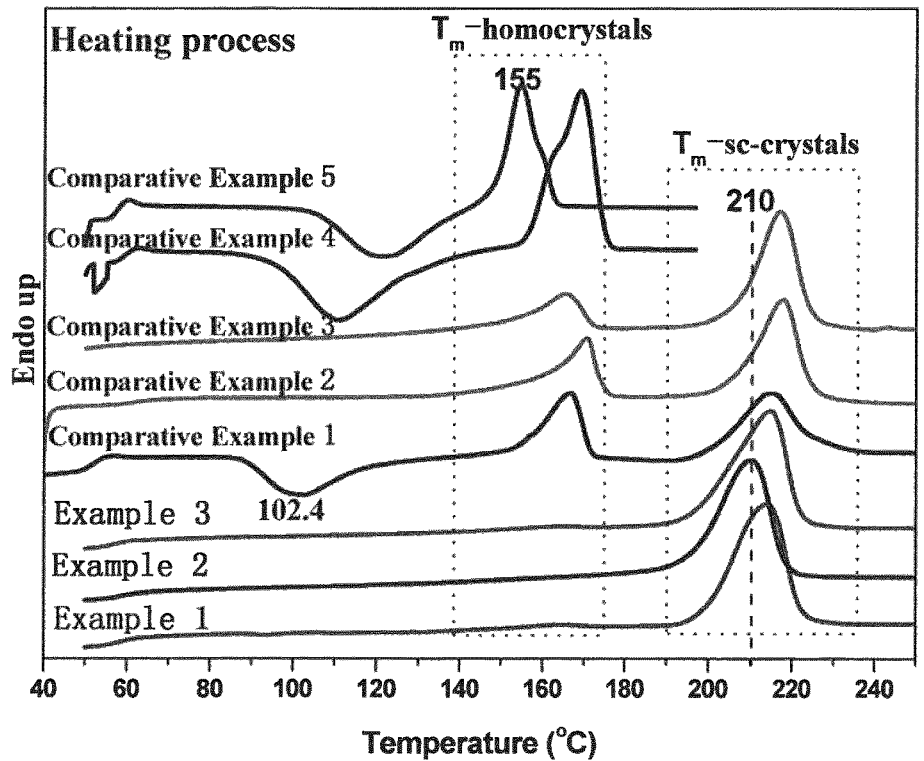
FIG. 2 shows the results of DSC during the heating process of the products of Examples 1, 2, and 3, and Comparative Examples 1, 2, 3, 4, and 5.

The non-isothermal crystallization behavior was measured by DSC on a TA instruments Q2000. DSC scans were obtained in the cooling processes from 250° C. to 50° C. and in the following second heating process to 250° C. The sample was heated to 250° C. to melt out any existing crystallinity before cooling. Cooling/heating rates were 10° C./min under nitrogen atmosphere. The results are shown in FIGS. 1 and 2, and Table 1.

Figure 3:
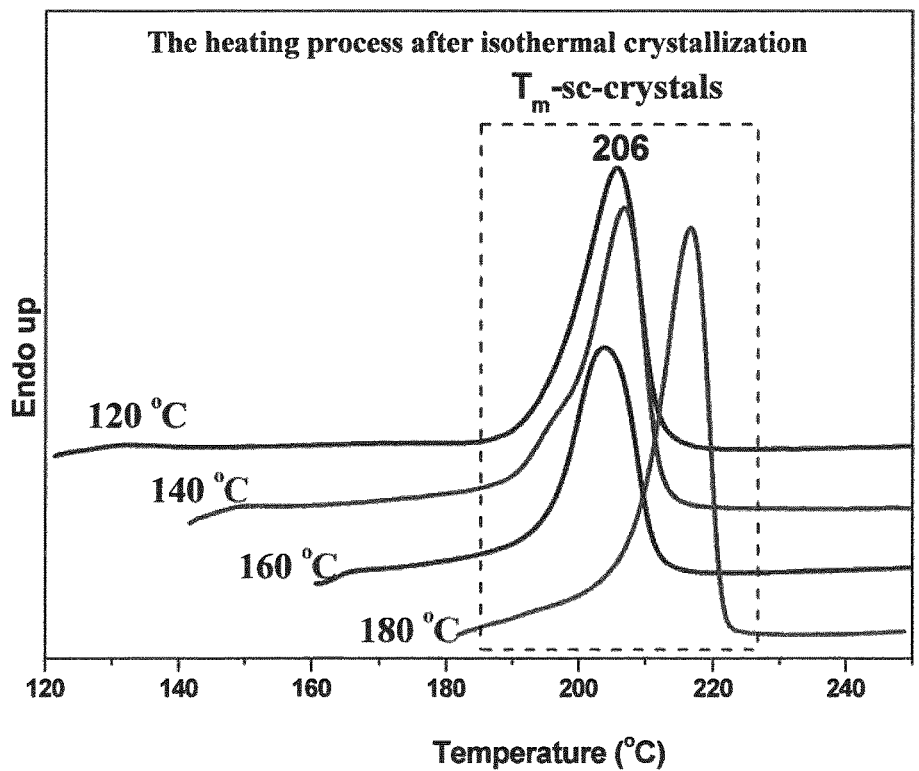
FIG. 3 shows the results of DSC during the heating process after isothermal crystallization of the product of Example 1.

The isothermal crystallization behavior was measured by DSC on a TA instruments Q2000. Typically, crystallization half-times were obtained after isothermal crystallization at different temperatures by quenching the molten sample from 250° C. to the isothermal crystallization temperature, while it was first heated to 250° C. to melt out any existing crystallinity. Crystallinity was allowed to develop at these fixed crystallization temperatures. The sample was subsequently heated at 10° C./min to 250° C. The results are shown in FIG. 3 and Table 2.

Example 2

50/50, PLLA/PDLA, 3 wt % N,N'-Dicyclohexylterephthalamide for Nucleating Agent

Equimolar PLLA and PDLA were dissolved in trichloromethane in a polymer concentration of 2 g/dL for 30 min, and 3 wt % (base on the gross weight of PLLA and PDLA) the nucleating agent N,N'-dicyclohexylterephthalamide was added. The method for preparing sample is similar to Example 1.

The composition containing 3 wt % of N,N'-dicyclohexylterephthalamide shows a crystallization exothermic peak at 147° C. during the cooling process and a single melting peak for the melting of stereocomplex crystals in the heating process can be seen around 210° C., the melting heat is about 48.5 J/g. The results of DSC at the cooling and heating processes show that the nucleator of N,N'-dicyclohexylterephthalamide can exclusively nucleate the stereocomplex crystals.

Figure 4:
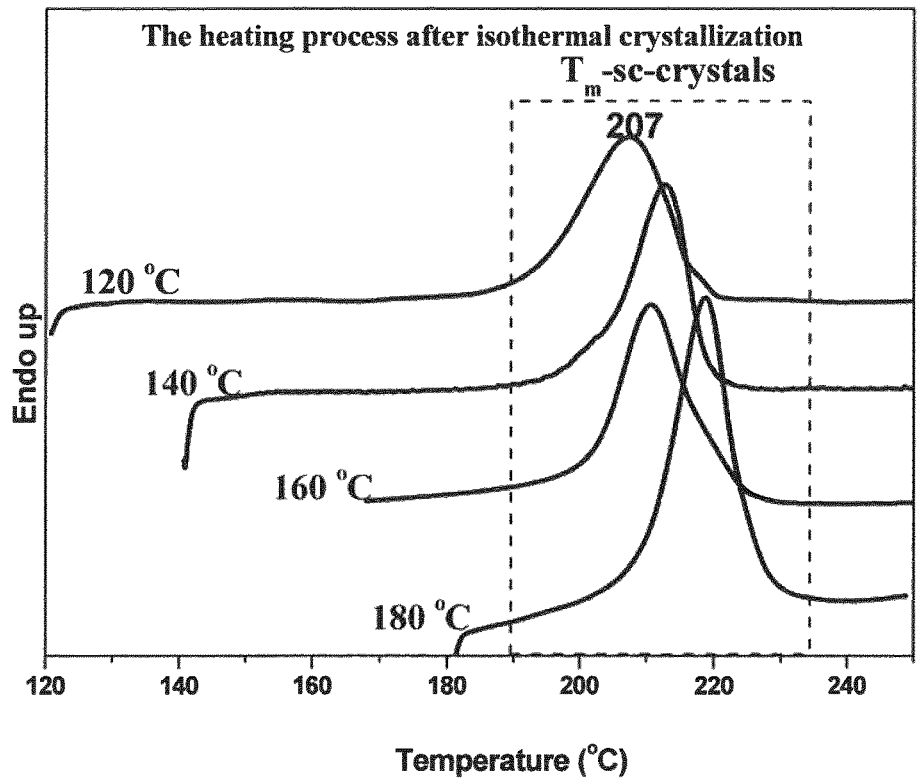
FIG. 4 shows the results of DSC during the heating process after isothermal crystallization of the product of Example 2.

The non-isothermal and isothermal crystallization behaviors were measured by DSC as described in Example 1, and the results are shown in FIGS. 1, 2 and 4, and in Tables 1 and 2.

Example 3

50/50, PLLA/PDLA, 0.25 wt % N,N'-Dicyclohexyl Terephthalamide and 0.25 wt % N,N',N"-Tricyclohexyl Trimesic Amide for Nucleating Agents Equimolar PLLA and PDLA were dissolved in trichloromethane in a polymer concentration of 2 g/dL for 30 min, and 0.25 wt % N,N'-dicyclohexyl terephthalamide and 0.25 wt % N,N',N"-tricyclohexyl trimesic amide (base on the gross weight of PLLA and PDLA) were added. The method for preparing the sample was similar to Example 1.

The composition containing 0.25 wt % N,N'-dicyclohexyl terephthalamide and 0.25 wt % N,N',N"-tricyclohexyl trimesic amide shows a crystallization exothermic peak at 129° C. during the cooling process and a single melting peak for the melting of stereocomplex crystals in the heating process can be seen around 212° C., the melting heat is about 49.4 J/g. The results of DSC at the cooling and heating processes show that the compound nucleators of N,N'-dicyclohexyl terephthalamide and N,N',N"-tricyclohexyl trimesic amide can exclusively nucleate the stereocomplex crystals.

Figure 5:
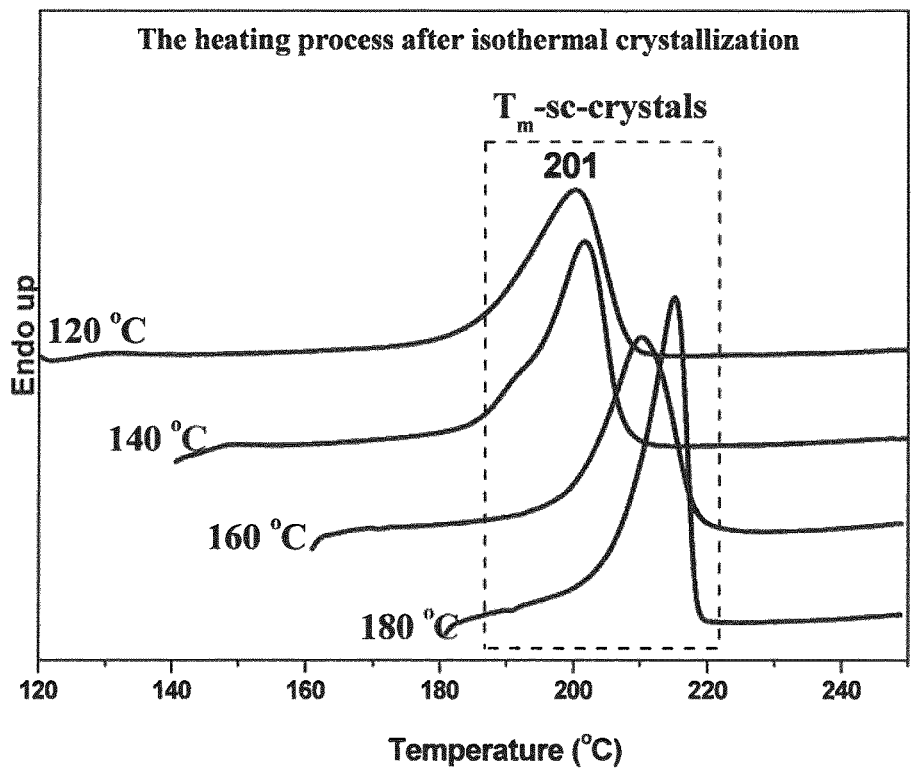
FIG. 5 shows the results of DSC during the heating process after isothermal crystallization of the product of Example 3.

The non-isothermal and isothermal crystallization behaviors were measured by DSC as described in Example 1, and the results are shown in FIGS. 1, 2 and 5, and in Tables 1 and 2.

Example 4

30/70, PLLA/PDLA, 3 wt % N,N'-Dicyclohexylterephthalamide for Nucleating Agent

The PLLA and PDLA were dissolved in trichloromethane in a polymer concentration of 2 g/dL for 30 min at a 30/70 ratio, and 3 wt % (base on the gross weight of PLLA and PDLA) of the nucleating agent N,N'-dicyclohexylterephthalamide was added. The method for preparing the sample was similar to Example 1.

Figure 9:
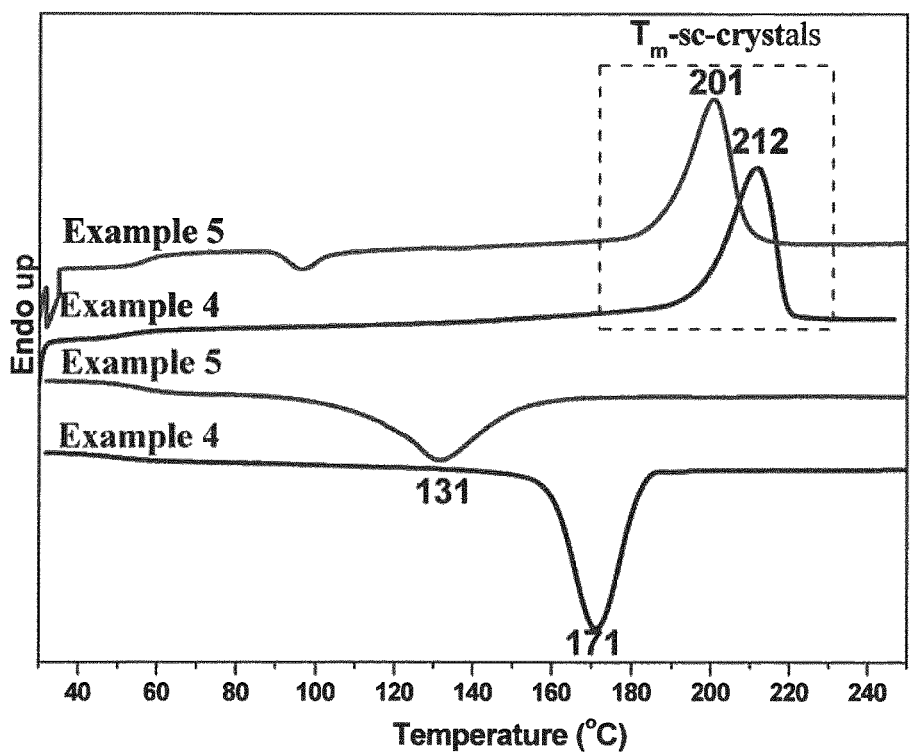
FIG. 9 shows the results of DSC during the heating process after isothermal crystallization of the products of Examples 4 and 5.

The non-isothermal crystallization behavior was measured by DSC as described in Example 1, and the result is shown in FIG. 9.

Example 5

70/30, PLLA/PDLA, 3 wt % N,N'-Dicyclohexylterephthalamide for Nucleating Agent

The PLLA and PDLA were dissolved in trichloromethane in a polymer concentration of 2 g/dL for 30 min at a 70/30 ratio, and 3 wt % (base on the gross weight of PLLA and PDLA) of the nucleating agent N,N'-dicyclohexylterephthalamide was added. The method for preparing the sample was similar to Example 1.

The non-isothermal crystallization behavior was measured by DSC as described in Example 1, and the result is also shown in FIG. 9.

Example 6

50/50, PLLA/PDLA, 1.5 wt % N,N'-Dicyclohexyl Terephthalamide and 1.5 wt % N, N',N''-Tricyclohexyl Trimesic Amide for Nucleating Agents Equimolar PLLA and PDLA were dissolved in trichloromethane in a polymer concentration of 2 g/dL for 30 min, and 1.5 wt % of N,N'-dicyclohexyl terephthalamide and 1.5 wt % of N,N',N''-tricyclohexyl trimesic amide (base on the gross weight of PLLA and PDLA) were added. The method for preparing sample was similar to Example 1.

Figure 10:
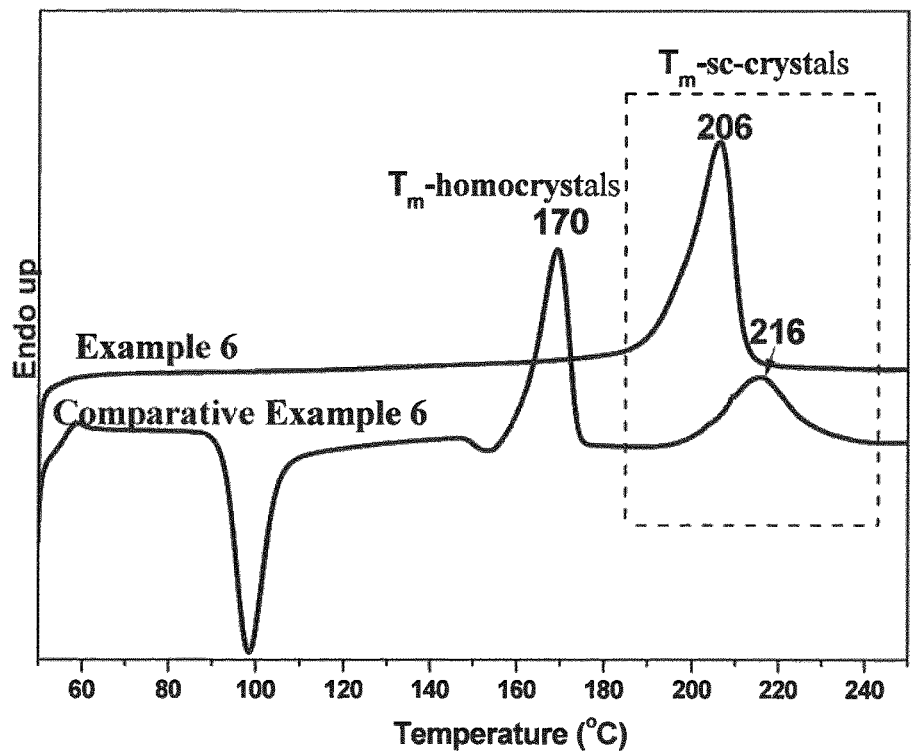
FIG. 10 shows the results of DSC during the heating process after isothermal crystallization of the products of Example 6 and Comparative Example 6.

The non-isothermal crystallization behavior was measured by DSC as described in Example 1, and the result is shown in FIG. 10 and Table 1.

Examples 7-17

The method of Examples 7-11 for preparing sample was similar to Example 1, and the method of Examples 12-17 for preparing sample was similar to Example 6, and the weight percentages of all components were as follows:

| Examples | 7 | 8 | 9 | 10 | 11 | 12 | 13 | 14 | 15 | 16 | 17 |
|---|---|---|---|---|---|---|---|---|---|---|---|
| (A) PLLA wt % | 20 | 80 | 60 | 40 | 55 | 45 |    | 65 | 35 | 30 | 70 | 75 |
| (B) PDLA wt % | 80 | 20 | 40 | 60 | 45 | 55 |    | 35 | 65 | 70 | 30 | 25 |
| Nucleating agents* wt % | | | | | | | | | | | |
| $R^1 = 3$ and $m = 1$ | 5 | | | | | 0.01 | | 2 | | 10 | |
| $R^1 = 4$ and $m = 6$ | | 3 | | | | | 2 | 2 | | | |
| $R^1 = 5$ and $m = 2$ | | | | | | 0.2 | | | 0.1 | | |
| $R^1 = 6$ and $m = 4$ | | | | 5 | | | 3 | | | | |
| $R^1 = 7$ and $m = 4$ | | | 3 | | | | 2 | 2 | | | |
| $R^1 = 8$ and $m = 3$ | | | | | 3 | | | 2 | | | 9 |

*$R^1$ is a cycloaliphatic group having 3-8 carbon atoms, m is an integer which ranges between and includes the values 1-6

Citing the N,N'-dicyclohexyl terephthalamide ($R^1=6$ and $m=2$) as example, the preparation method was as follows: the N,N'-dicyclohexyl terephthalamide was synthesized with the paraphthaloyl chloride and cyclohexane as the materials. Reaction was conducted in an inert solvent and at a certain temperature under stirring. The material of paraphthaloyl chloride was obtained with the terephthalic acid as the materials by sulfoxide chloride method. The CAS number of N,N'-dicyclohexyl terephthalamide is 15088-29-6.

The results of FT-IR, $^{13}$C NMR and $^1$H NMR showed that the foregoing structure was indeed obtained.

Example 18

Figure 12:
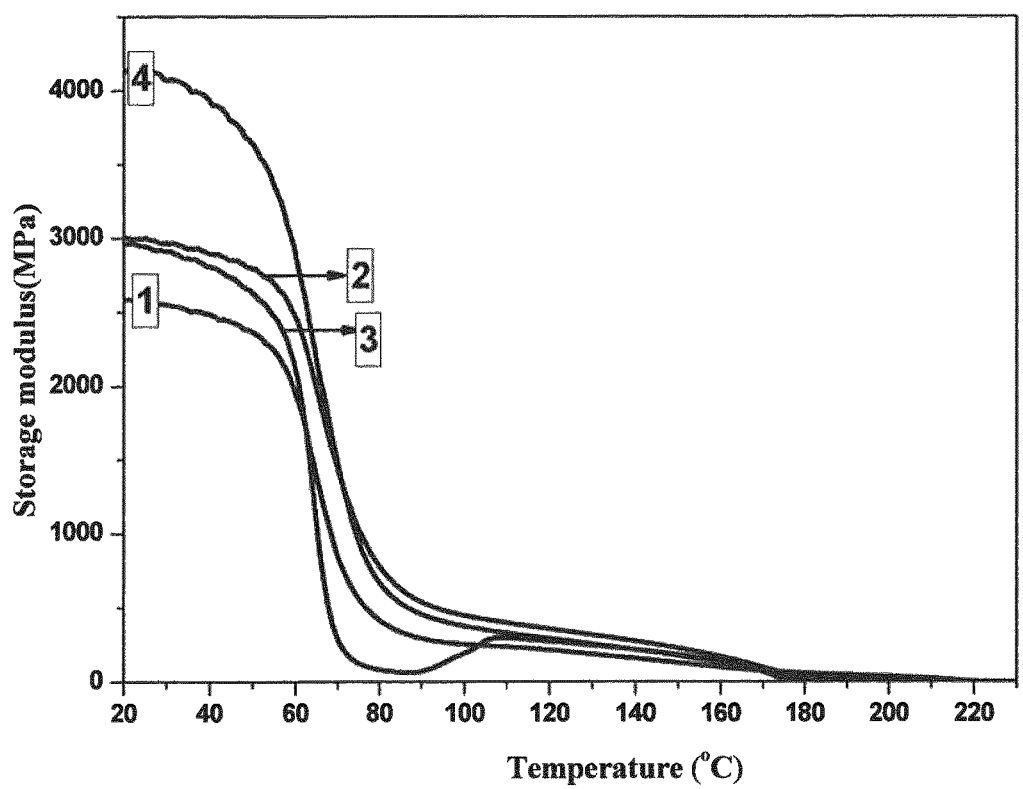
FIG. 12 shows the storage modulus E' of PLLA, a polylactic acid stereocomplex composition and its molded product as a function of temperature for of the products of Example 18 (curve 1) and 19 (curve 2) and Comparative Example 7 (curve 4) and 8 (curve 3).

The method of Example 18 for preparing molded product was similar to Example 1 or 6. Dynamic mechanical properties were investigated using a dynamic mechanical analyzer DMA. Samples in the form of strips (10 mm×6 mm×1.8 mm) were measured in tensile mode at a constant frequency of 1.0 Hz as a function of temperature from 20-250° C. at a heating rate of 3° C./min under nitrogen flow, and the result is shown in FIG. 12.

Example 19

The method of Examples 19 for preparing molded product was similar to Example 2. Dynamic mechanical properties were investigated using a dynamic mechanical analyzer DMA. Samples in the form of strips (10 mm×6 mm×1.8 mm) were measured in tensile mode at a constant frequency of 1.0 Hz as a function of temperature from 20-250° C. at a heating rate of 3° C./min under nitrogen flow, and the result is shown in FIG. 12.

Comparative Example 1

50/50, PLLA/PDLA

Equimolar PLLA and PDLA were dissolved in trichloromethane in a polymer concentration of 2 g/dL for 2 h, no nucleating agent was added. The method for preparing sample was similar to Example 1.

Figure 6:
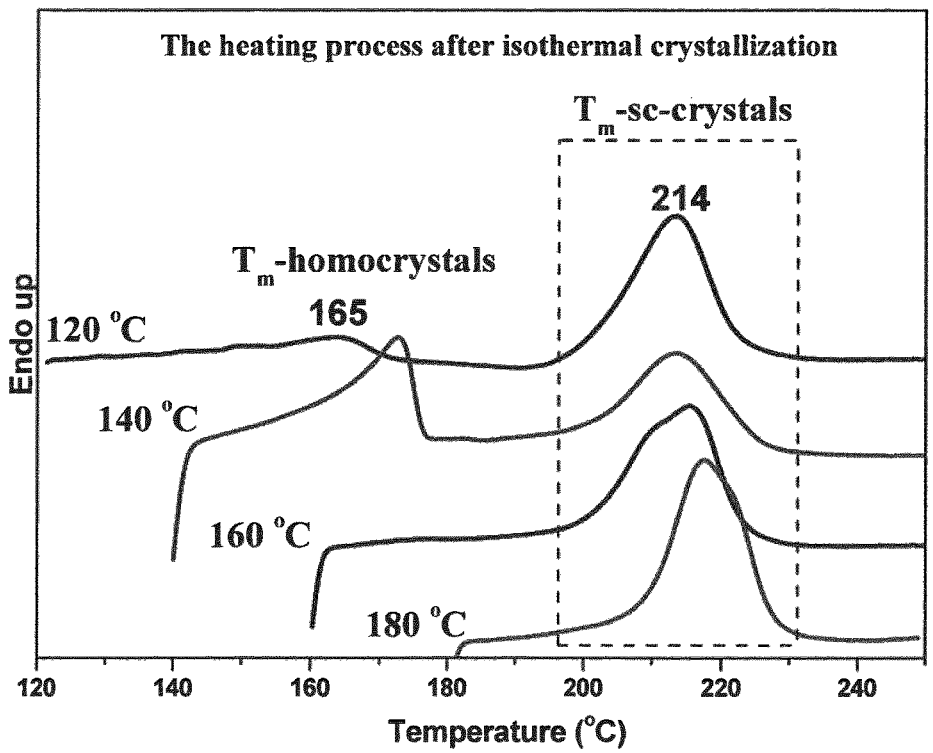
FIG. 6 shows the results of DSC during the heating process after isothermal crystallization of the product of Comparative Example 1.

The non-isothermal and isothermal crystallization behaviors were measured by DSC as described in Example 1, and the results are shown in FIGS. 1, 2 and 6, and Tables 1 and 2.

Comparative Example 2

50/50, PLLA/PDLA, 0.5 wt % Montmorillonite as the Nucleating Agent

Equimolar PLLA and PDLA were dissolved in trichloromethane in a polymer concentration of 2 g/dL for 2 h, 0.5 wt % (base on the gross weight of PLLA and PDLA) of montmorillonite was added. The method for preparing the sample was similar to Example 1.

Figure 7:
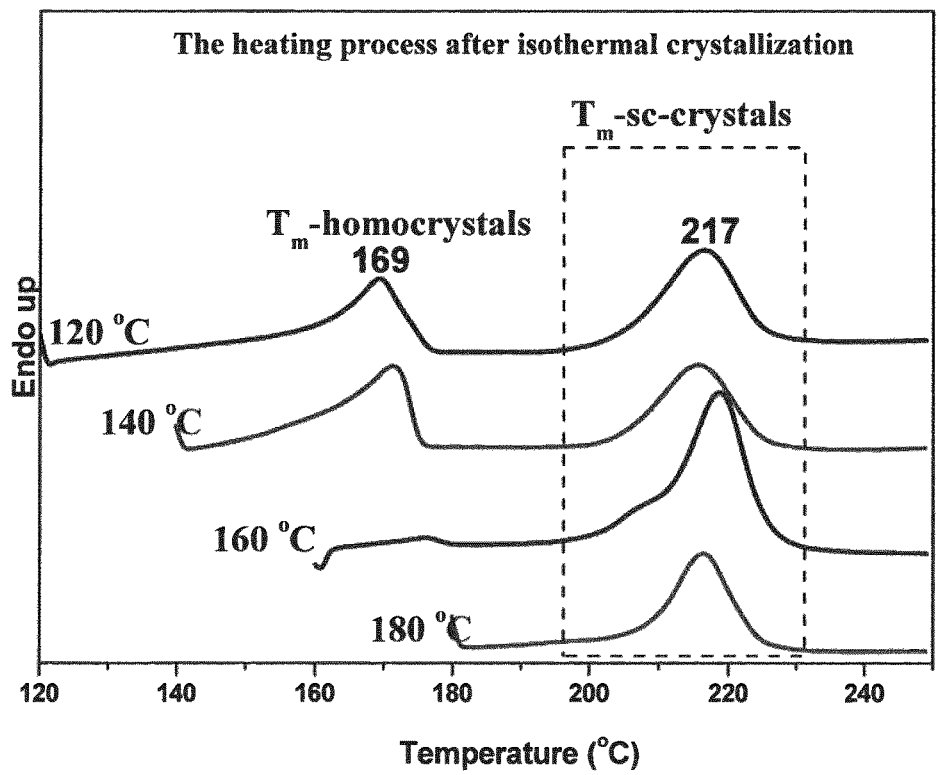
FIG. 7 shows the results of DSC during the heating process after isothermal crystallization of the product of Comparative Example 2.

The non-isothermal and isothermal crystallization behaviors were measured by DSC as described in Example 1, and the results are shown in FIGS. 1, 2 and 7, Tables 1 and 2.

Comparative Example 3

50/50, PLLA/PDLA, 0.5 wt % Talc as the Nucleating Agent

Equimolar PLLA and PDLA were dissolved in trichloromethane in a polymer concentration of 2 g/dL for 2 h, 0.5 wt % (base on the gross weight of PLLA and PDLA) of the nucleating agent mineral talc was added. The method for preparing the sample was further similar to Example 1.

Figure 8:
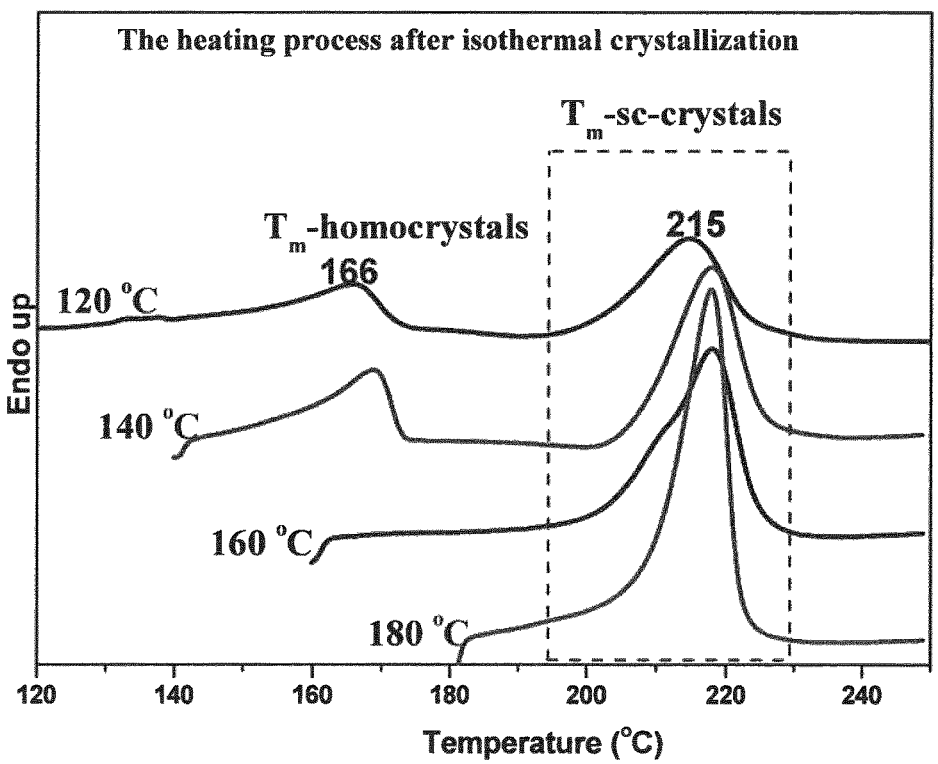
FIG. 8 shows the results of DSC during the heating process after isothermal crystallization of the product of Comparative Example 3.

The non-isotheimal and isothermal crystallization behaviors were measured by DSC as described in Example 1, and the results are shown in FIGS. 1, 2 and 8, Tables 1 and 2.

Comparative Example 4

100% PLLA

PLLA resin was dissolved in trichloromethane in a polymer concentration of 2 g/dL for 2 h, no nucleating agent was added. The method for preparing the sample was similar to Example 1.

The non-isothermal crystallization behavior was measured by DSC as described in Example 1, and the results are shown in FIGS. 1 and 2, and Table 1.

Comparative Example 5

100% PLLA, 3 wt % N,N'-Dicyclohexylterephthalamide as Nucleating Agent

PLLA resin was dissolved in trichloromethane in a polymer concentration of 2 g/dL for 2 h, 3 wt % (base on the weight of PLLA) the nucleating agent N,N'-dicyclohexylterephthalamide was added. The method for preparing sample was similar to Example 1.

The non-isothermal crystallization behavior was measured by DSC as described in Example 1, and the results are shown in FIGS. 1 and 2, and Table 1.

Comparative Example 6

50/50, PLLA/PDLA

Equimolar PLLA and PDLA were dissolved in trichloromethane in a polymer concentration of 2 g/dL for 30 min, no nucleating agent was added. The method for preparing sample was similar to previous Example 6.

The non-isothermal crystallization behavior was measured by DSC as described in Example 1, and the result is shown in FIG. 10 and Table 1.

Comparative Example 7

The method of Comparative Examples 7 for preparing molded product was similar to Comparative Example 4. Dynamic mechanical properties were investigated using a dynamic mechanical analyzer DMA. Samples in the form of strips (10 mm×6 mm×1.8 mm) were measured in tensile mode at a constant frequency of 1.0 Hz as a function of temperature from 20-250° C. at a heating rate of 3° C./min under nitrogen flow, and the result is shown in FIG. 12.

Comparative Example 8

The method of Comparative Example 8 for preparing molded product was similar to Comparative Example 1 or 6. Dynamic mechanical properties were investigated using a dynamic mechanical analyzer DMA. Samples in the form of strips (10 mm×6 mm×1.8 mm) were measured in tensile mode at a constant frequency of 1.0 Hz as a function of temperature from 20-250° C. at a heating rate of 3° C./min under nitrogen flow, and the result is shown in FIG. 12.

The DSC results of non-isothermal crystallization during cooling and second heating processes and isothermal crystallization are shown in FIG. 1, 2, and Tables 1 and 2.

TABLE 1

| Samples | $T_c$ (° C.) α | $T_c$ (° C.) sc | $\Delta H_c$ (J/g) α | $\Delta H_c$ (J/g) sc | $T_m$ (° C.) α | $T_m$ (° C.) sc | $\Delta H_m$ (J/g) α | $\Delta H_m$ (J/g) sc |
|---|---|---|---|---|---|---|---|---|
| Example 1 | — | 120.0 | — | 49.4 | — | 208.3 | — | 49.9 |
| Example 2 | — | 146.0 | — | 47.6 | — | 210.2 | — | 48.5 |
| Example 3 | — | 129.0 | — | 47.2 | — | 209.1 | — | 50.5. |
| Example 4 | — | 133.2 | — | 48.9 | — | 207.1 | — | 53.3 |
| Example 5 | — | 140.1 | — | 50.2 | — | 206.7 | — | 51.5 |
| Example 6 | — | 142.4 | — | 53.6 | — | 206.0 | — | 55.2 |
| Comparative Example 1 | 118.4 | | 14.4 | | 167.0 | 215.4 | 17.0 | 23.2 |
| Comparative Example 2 | 129.1 | 167.2 | 16.4 | 28.8 | 171.3 | 218.1 | 18.7 | 31.5 |
| Comparative Example 3 | 117.2 | 155.0 | 9.6 | 29.6 | 166.2 | 217.4 | 14.7 | 35.9 |
| Comparative Example 4 | 96.4 | — | 3.5 | — | 169.1 | — | 4.0 | — |
| Comparative Example 5 | — | — | — | — | 155.3 | — | 0.9 | — |
| Comparative Example 6 | 117.8 | | 4.8 | | 169.7 | 216.1 | 25.5 | 21.1 |

Remarks: $T_c$, crystallization temperature; $\Delta H_c$, crystallization enthalpy; $T_m$, melting point; $\Delta H_m$, melting heat.

TABLE 2

| T (° C.) | 180 | 160 | 140 | 120 |
|---|---|---|---|---|
| $t_{Example\ 1}$ (min) | 47.3 | 24.2 | 2.8 | 2.4 |
| $t_{Example\ 2}$ (min) | 12.5 | 3.2 | <1 | 1.3 |
| $t_{Example\ 3}$ (min) | 4 | 1.2 | <1 | 1.3 |
| $t_{Comparative\ Example\ 1}$ (min) | 46.5 | 15.7 | 3.7 | 1.98 |
| $t_{Comparative\ Example\ 2}$ (min) | 2 | 0.6 | 3.6 | 1.3 |
| $t_{Comparative\ Example\ 3}$ (min) | 4.8 | 1.7 | <1 | 2 |

Remarks: t, the crystallization half-time.

Figure 11:
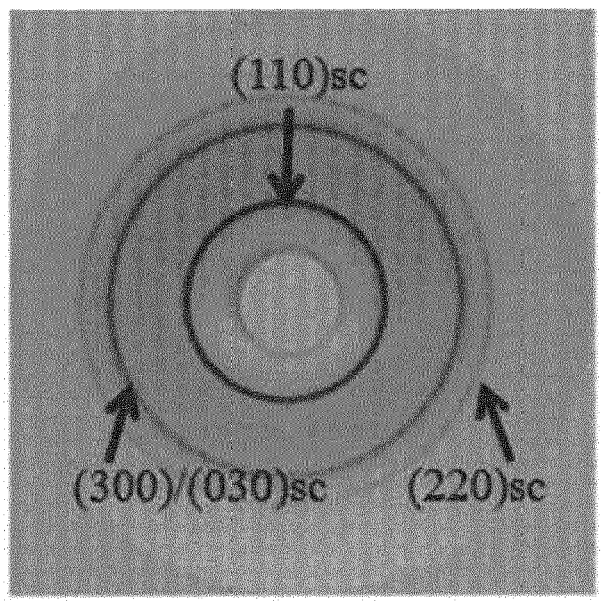
FIG. 11 shows the 2D-WAXS pattern of formed stereocomplex crystals for the products of Examples 1, 2, 3, 4, 5 or 6.

Stereocomplex crystals are preferentially formed in the compositions containing N,N'-dicyclohexylterephthalamide and/or N,N',N"-tricyclohexyltrimesicamide according to the invention (Examples 1, 2 and 3), and the homocrystals (a crystal form) for the PLLA or PDLA homopolymer cannot be observed. Selected 2D WAXS patterns of the composition are shown in FIG. 11, the crystal planes (110), (300)/(030) and (220) of the stereocomplex crystals form can be seen, confirming that the sample only crystallized as pure stereocomplex crystal (sc-crystal). However, there are obvious exothermal peaks at about 130° C. during cooling and endothermal peak at about 165° C. during second heating process for the homocrystals crystallization and melting in the sample of Comparative Examples 1, 2 and 3, the homocrystals appears at cooling and heating processes, coexisting with the stereocomplex crystals in the sample. Furthermore, in order to understand the effect of the nucleator on the homo-crystals, the crystallization behavior of PLLA and PLLA/N,N'-dicyclohexylterephthalamide blend (Comparative Examples 4 and 5) was also investigated (FIGS. 1 and 2). As cooling from 250° C., no peak is observed during cooling process for two samples, which means that the crystallization ability of PLLA is weaker, no matter what nucleating agent was added. The results of DSC show that the selected nucleating agent N, N'-dicyclohexylterephthalamide and/or N,N',N"-tricyclohexyltrimesicamide can nucleate the stereocomplex crystals selectively.

The results of isothermal crystallization at different temperatures are shown in FIGS. 3 through 10, and Table 2, indicating that the crystallization half-time of the instant invention composition (Examples 1 through 5) is short observably, and only a single peak in the heating process for the stereocomplex crystals presented around 210° C. after isothermal crystallization at the temperature above 120° C., even for the non-equimolar mixtures of PLLA and PDLA and the molded product by melt blending (Example 6). However, the compositions containing mineral talc or montmorillonite or without nucleator (Comparative Examples 1, 2 and 3) exhibit two peaks in the heating process for the homocrystals and stereocomplex crystals, respectively, present at approximately 166 and 215° C. after isothermal crystallization at a temperature below 160° C.

Figure 13:
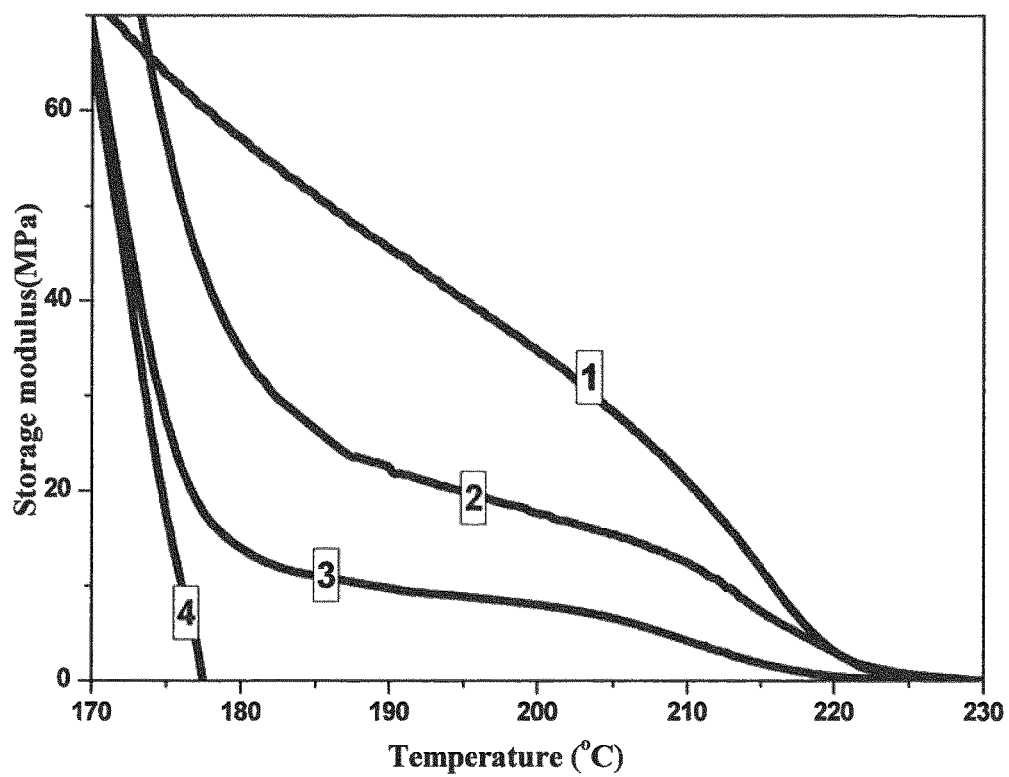
FIG. 13 shows the enlarged profiles of FIG. 12 in a higher temperature region.

The high content of stereocomplex PLA crystals and the product with high heat-resistant property can be obtained with the material according to the present invention. The curves of storage modulus E' of PLLA, a polylactic acid stereocomplex composition and its molded product as a function of temperature for of the products of Example 18 (curve 1) and 19 (curve 2) and Comparative Example 7 (curve 4) and 8 (curve 3) are shown in FIGS. 12 and 13. The samples of Examples 18 and 19 show the higher storage modulus above 180° C., more than twice the E' value of Comparative Example 8. However, the pure PLLA sample (Comparative Example 7) melts at this temperature, hence the value of the storage modulus E' drops to zero.

The current invention discloses a polylactic acid stereocomplex composition that can be used for solution blending, melt blending, molding or spinning. The stereocomplex PLA product with high melting point, high heat-resistant property, high content of and pure stereocomplex crystals can be obtained with the disclosed composition. A polylactic acid stereocomplex composition according to the instant invention can be applied in agricultural and garment material, in food packaging, building material, medical cloth and the production for other heat-resistant end-uses.

The invention claimed is:

1. A polylactic acid stereocomplex composition comprising a polylactide blend containing poly (D-lactic acid), and poly (L-lactic acid); and a nucleating agent, wherein the nucleating agent is an aryl amide derivative having the general formula (I);

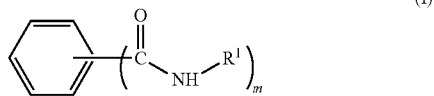

(I)

wherein $R^1$ is a cycloaliphatic group having 3-8 carbon atoms, and m is 2.

2. The polylactic acid stereocomplex composition according to claim 1 comprising 0.01-10 wt % of the nucleating agent and 90-99.99 wt % of the polylactide blend, and wherein the polylactic acid stereocomplex composition contains pure stereocomplex crystals.

3. The polylactic acid stereocomplex composition according to claim 2, wherein the polylactide blend comprises 30-70 wt % poly (L-lactic acid) and 70-30 wt % poly (D-lactic acid).

4. The polylactic acid stereocomplex composition according to claim 1, wherein $R^1$ represents a naphthenic group with 5 or 6 carbon atoms.

5. The polylactic acid stereocomplex composition according to claim 1 wherein the nucleating agent is N,N'-dicyclohexylterephthalamide.

6. The polylactic acid stereocomplex composition according to claim 1 comprising 0.2-5 wt % of the nucleating agent.

7. The polylactic acid stereocomplex composition according to claim 1, wherein the weight-average molecular weight of at least one of the components poly (L-lactic acid) and poly (D-lactic acid) is 10-500 kg/mol, and the optical purity of at least one of the components poly (L-lactic acid) and poly (D-lactic acid) is above 90%.

8. The polylactic acid stereocomplex composition according to claim 1, wherein the melting point of the composition is above 200° C.

9. The polylactic acid stereocomplex composition according to claim 1, wherein the relative content of the stereocomplex crystals in the crystal phase is above 95%, whereby the crystallization is isothermal at a temperature above 120° C.

10. A molded product comprising polylactic acid stereocomplex composition as claimed in claim 1.

11. The molded product according to claim 10, wherein the melting point of the composition during a second heating process is 200-230° C., and a melting enthalpy $\Delta H_m$ range is between 45 and 60 J/g.

12. The molded product according to claim 10, wherein the storage modulus is between 20 MPa and 60 MPa at 180° C. in curves generated using a dynamic mechanical analyzer.

13. A process for manufacturing the polylactic acid stereocomplex composition according to claim 1, comprising a step selected from solution and melt blending.

14. The process for manufacturing according to claim 13, wherein poly (L-lactic acid) and poly (D-lactic acid) resins are mixed in trichloromethane at a weight ratio of poly (L-lactic acid)/poly (D-lactic acid) ranging from 30/70 to 70/30, to which mixture 0.01-10 wt % of the nucleating agent, based on a gross weight of the poly (L-lactic acid) and poly (D-lactic acid), is added, to form a mixture and the mixture being subsequently stirred for 1-60 min, after which the stirred mixture is cast on a surface and dried in vacuo, whereby the polylactide stereocomplex composition is obtained.

15. The polylactic acid stereocomplex composition according to claim 1 configured for application in garment material, food packaging, medical cloth and heat-resistant end-uses.

16. The polylactic acid stereocomplex composition according to claim 2, wherein the polylactide blend comprises 50 wt % poly (L-lactic acid) and 50 wt % poly (D-lactic acid).

17. The polylactic acid stereocomplex composition according to claim 1 comprising 0.5-3 wt % of the nucleating agent.

18. The polylactic acid stereocomplex composition according to claim 1, wherein the weight-average molecular weight of at least one of the components poly (L-lactic acid) and poly (D-lactic acid) is 10-500 kg/mol, and the optical purity of at least one of the components poly (L-lactic acid) and poly (D-lactic acid) is above 98%.

19. The polylactic acid stereocomplex composition according to claim 1, wherein the melting point of the composition is between 200 and 230° C.

20. The polylactic acid stereocomplex composition according to claim 1, wherein the relative content of the stereocomplex crystals in the crystal phase is substantially 100%, whereby the crystallization is isothermal at a temperature between 120° C. and 140° C.

* * * * *